Nov. 8, 1955  G. A. CARLSON  2,722,786
BELT POLISHER LATHE
Filed July 27, 1953  8 Sheets-Sheet 1

INVENTOR.
GLEN A. CARLSON
BY Whittemore
Hulbert & Belknap
ATTORNEYS

Nov. 8, 1955  G. A. CARLSON  2,722,786
BELT POLISHER LATHE

Filed July 27, 1953  8 Sheets-Sheet 3

*INVENTOR.*
GLEN A. CARLSON
BY Whittemore,
Hulbert & Belknap
ATTORNEYS

Nov. 8, 1955 G. A. CARLSON 2,722,786
BELT POLISHER LATHE
Filed July 27, 1953 8 Sheets-Sheet 4
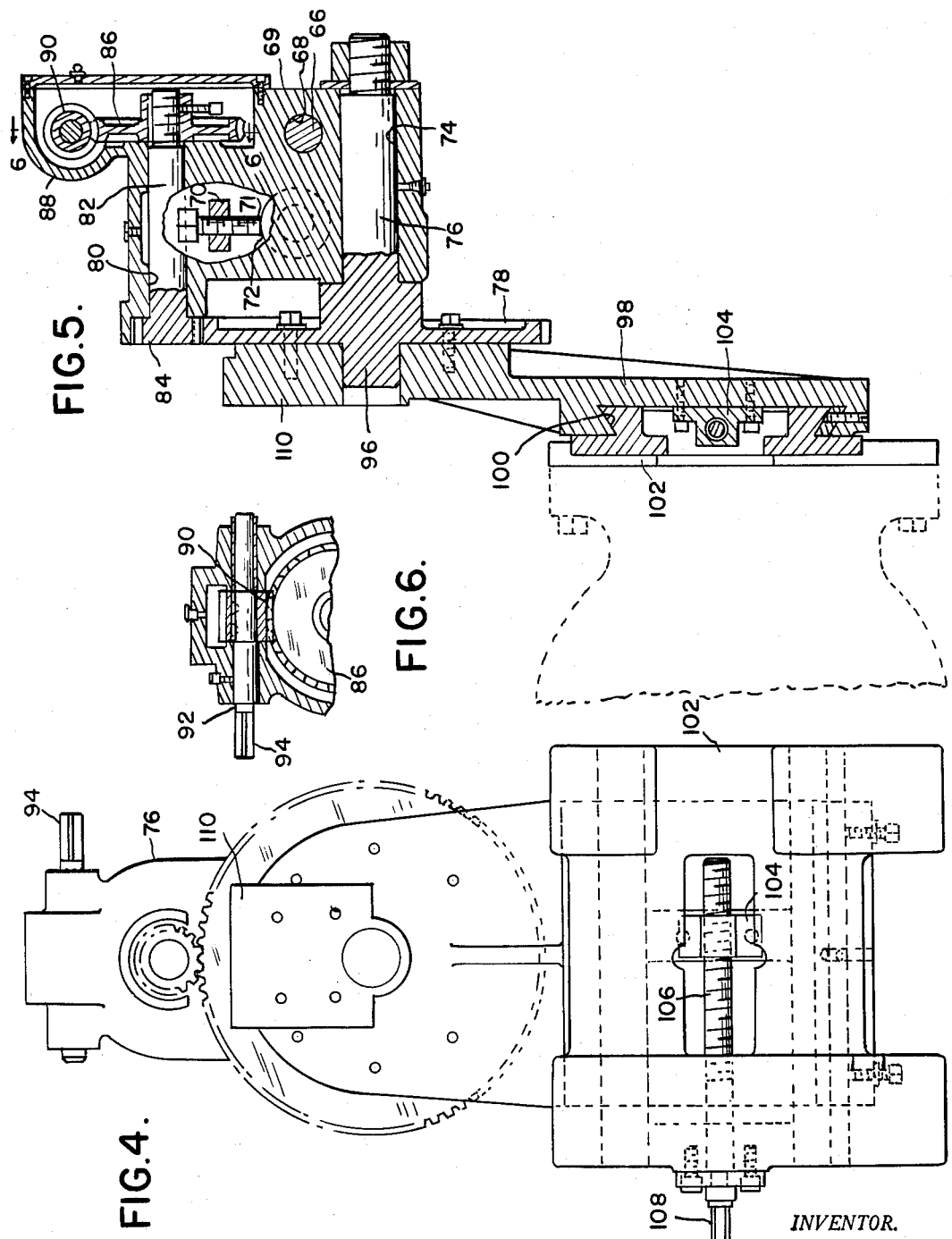
INVENTOR.
GLEN A. CARLSON
BY
ATTORNEYS Nov. 8, 1955  G. A. CARLSON  2,722,786
BELT POLISHER LATHE Filed July 27, 1953  8 Sheets-Sheet 5

INVENTOR.
GLEN A. CARLSON
BY Whittemore,
Hulbert & Belknap
ATTORNEYS

Nov. 8, 1955

G. A. CARLSON 2,722,786

BELT POLISHER LATHE

Filed July 27, 1953

INVENTOR.
GLEN A. CARLSON
BY Whittemoy,
Hulbert & Belknap
ATTORNEYS

Nov. 8, 1955  G. A. CARLSON  2,722,786
BELT POLISHER LATHE
Filed July 27, 1953  8 Sheets-Sheet 7
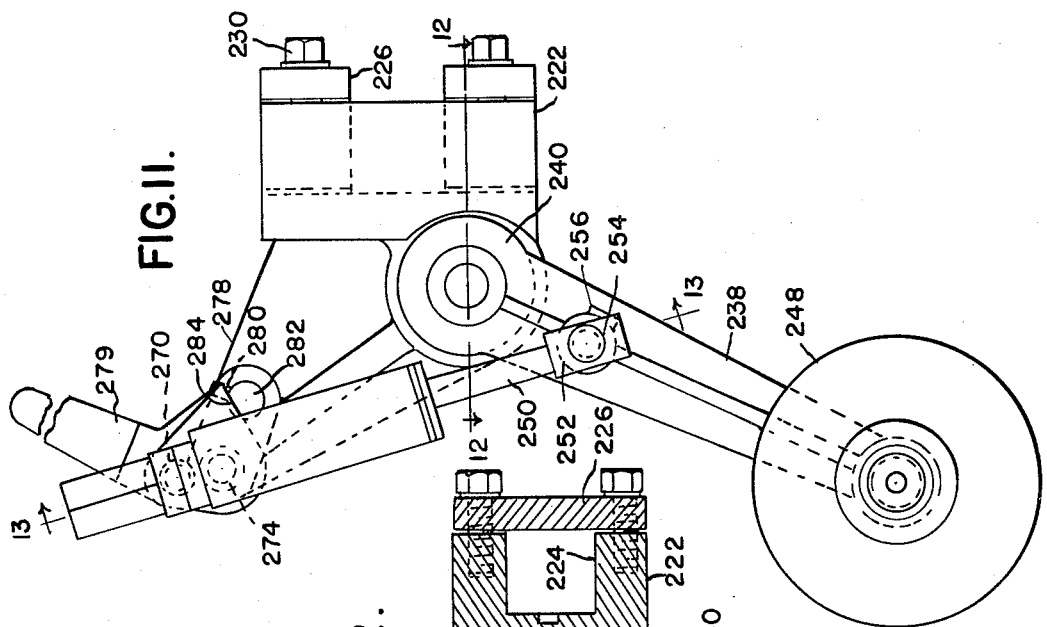
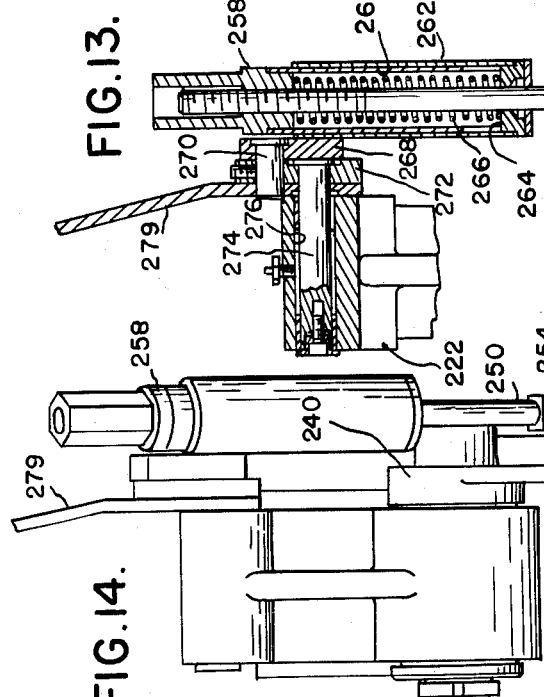
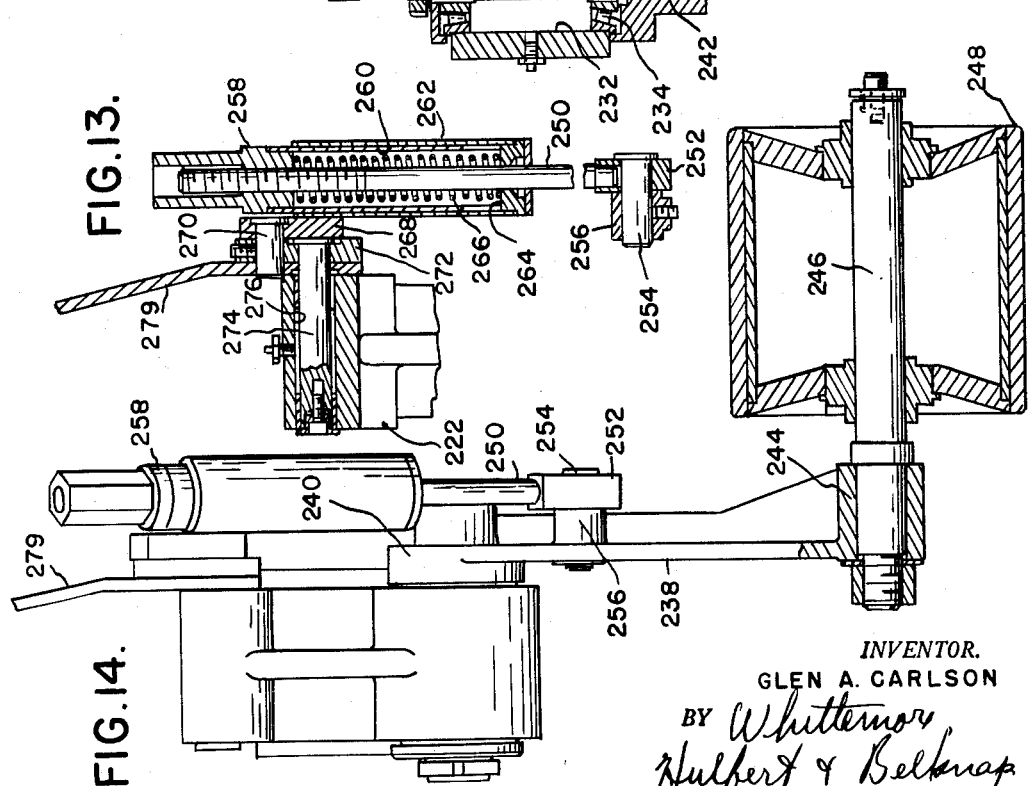
INVENTOR.
GLEN A. CARLSON
BY Whittemore,
Hulbert & Belknap
ATTORNEYS

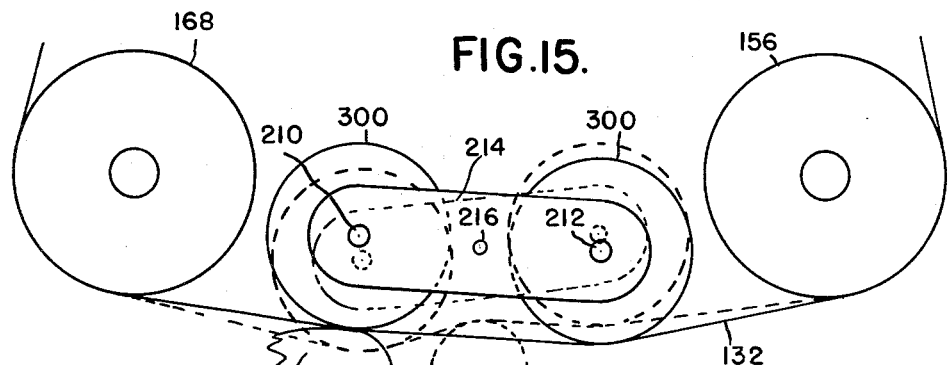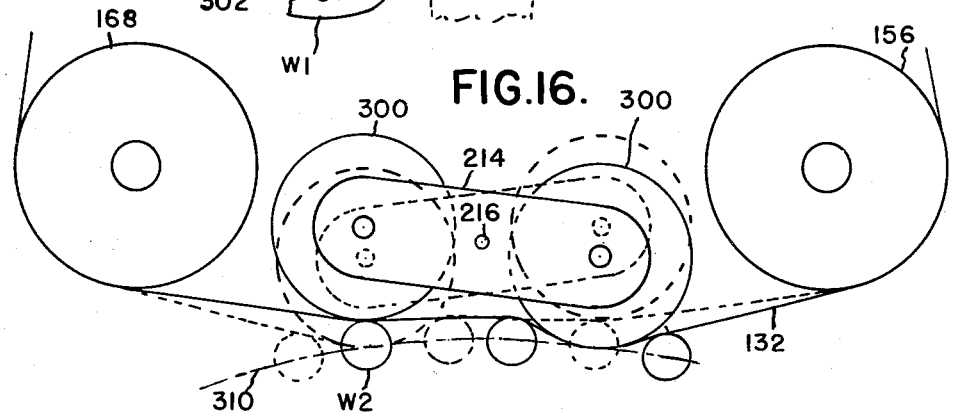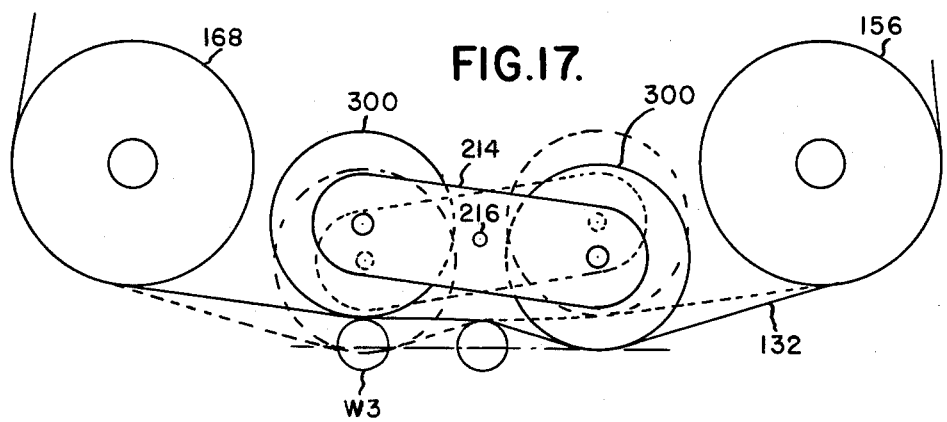

United States Patent Office 2,722,786
Patented Nov. 8, 1955

2,722,786

BELT POLISHER LATHE

Glen A. Carlson, Detroit, Mich.

Application July 27, 1953, Serial No. 370,360

14 Claims. (Cl. 51—141)

The present invention relates to a belt polisher lathe, and more particularly to an apparatus for driving an endless polishing or abrading belt in position to operate upon a series of work pieces advanced serially to working position.

It is an object of the present invention to provide a belt polisher lathe having a pair of spaced guide pulleys over which an endless operating belt is led, in combination with a floating wheel or pair of wheels adapted to engage the inner surface of the belt intermediate the pulleys to press the working surface of the belt against a work piece.

It is a further object of the present invention to provide an endless operating belt movable over a pair of guide pulleys with a pair of contact wheels mounted on a rocking bar located between the guide pulleys to control belt contact with work pieces.

It is a further object of the present invention to provide a lathe of the character described comprising a series of pulleys around which is led an endless operating belt, in combination with a floatable wheel adapted to engage the inner surface of the belt and to press it against a work piece, means for selectively urging the wheel to polishing or retracted position, and a belt tightener mechanism effective to maintain the belt tight in all positions of the polishing wheel.

It is a further object of the present invention to provide a lathe of the character described characterized by the provision of novel structure for effecting substantially universal adjustment of the polishing mechanism.

Other objects and features of the invention will become apparent as the description proceeds, especially when taken in conjunction with the accompanying drawings, wherein:

Figure 4 is a detail elevational view of the motor plate tilt gear head assembly.

Figure 5 is a vertical section through the head assembly illustrated in Figure 4.

Figure 6 is a fragmentary section on the line 6—6, Figure 5.

Figure 11 is a front elevational view of the belt tightener release lever bracket assembly employed in the machine.

Figure 12 is a fragmentary sectional view on the line 12—12, Figure 11.

Figure 13 is a sectional view on the line 13—13, Figure 11.

Figure 14 is a fragmentary side elevational view of the assembly shown in Figure 11.

Figure 15 is a diagrammatic view illustrating the action of rocking contact wheels with an irregular work piece.

Figure 16 is a view similar to Figure 15 illustrating the action of rocking contact wheels with continuously advanced work pieces.

Figure 17 is a view similar to Figure 15 illustrating the action of rocking contact wheels with intermittently advanced work pieces.

Figure 2:
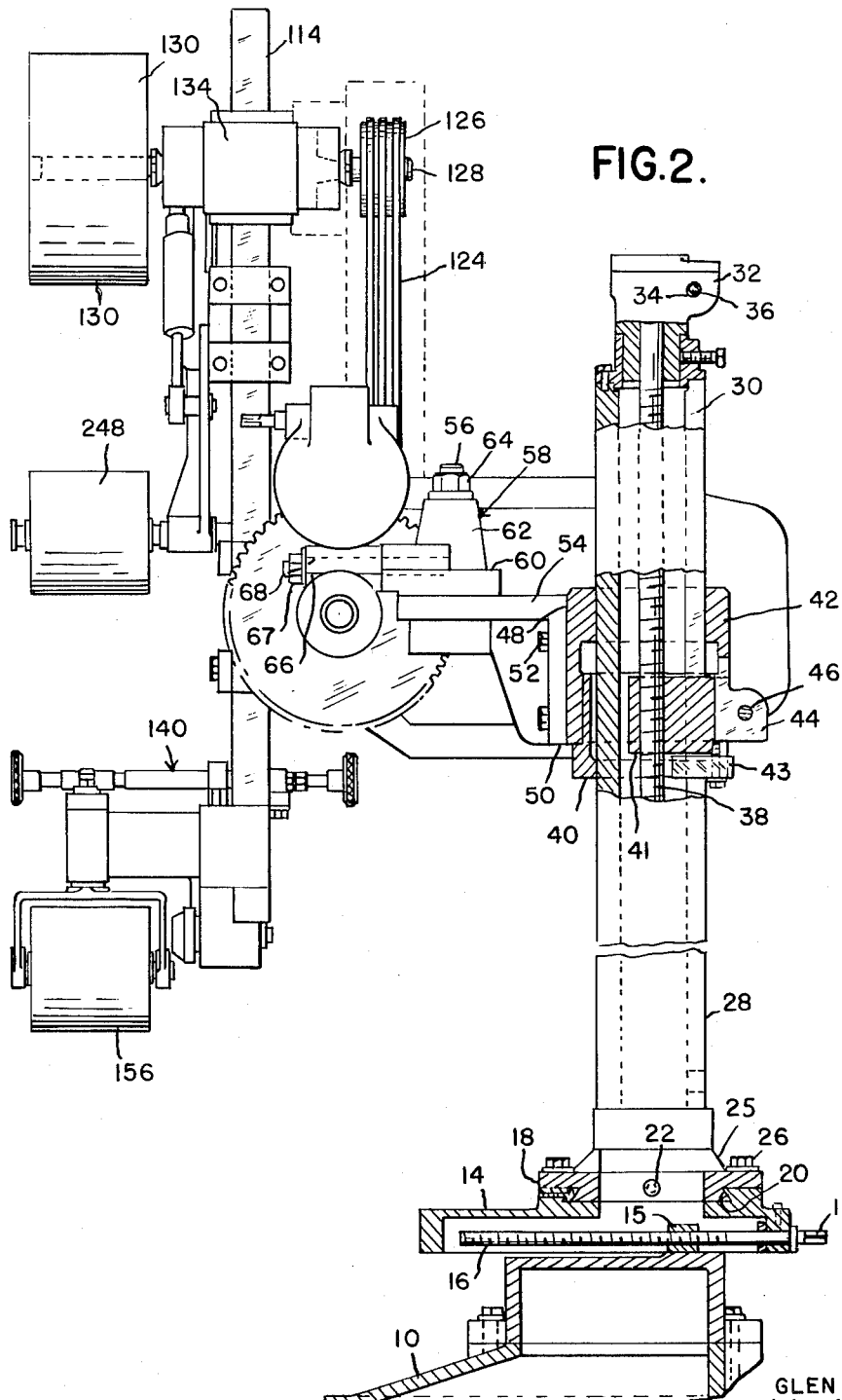
Figure 2 is a side elevation of the machine illustrated in Figure 1, as seen from the right in this figure, partly in section.

Referring now to the drawings, the machine comprises a two-piece base 10 which may if desired be bolted or otherwise rigidly secured to the floor or a supporting platform. Mounted on the base 10 are ways indicated generally at 12 for a lower slide 14 provided with conventional means for effecting movement of the slide longitudinally of the ways. This conventional means may include a feed nut 15 carried by the base 10 cooperating with a feed screw 16 terminating in a squared end 17 whereby rotation of the feed screw effects movement of the lower slide 14 from right to left as seen in Figure 2.

Carried by the lower slide 14 is an upper slide 18 mounted in ways 20 which extend in a horizontal plane at right angles to the direction of the ways 12.

Means are provided for effecting movement of the upper slide 18 longitudinally of its ways and comprise a feed nut 20 secured to the lower slide 14 and a feed screw 22 mounted for rotation and held against longitudinal reciprocation by the upper slide 18. The screw 22 is provided with a squared end 24 and may be rotated by a suitable tool to effect movement of the upper slide 18 longitudinally of its ways.

The construction so far described will provide an upper slide 18 which may be adjusted in any direction in a horizontal plane.

Mounted on the upper slide 18 is a mounting bracket 25 which is adapted to be bolted to the upper slide 18 as indicated at 26. Carried by the bracket 25 is a vertically extending round column 28 provided with a relatively wide slot 30 extending from adjacent the bottom of the column completely to the top thereof. At the top of the column there is provided a gear head assembly housing 32 within which is a worm mounted on a shaft 34 and provided with a square end as indicated at 36. Extending vertically through the major length of the column 28 is a threaded shaft 38 having at its upper end a worm gear (not shown) in mesh with the worm carried by the shaft 34. Obviously, rotation of the worm by the shaft 34 results in rotation of the threaded shaft 38. Vertically movable on the column 28 is a collar 40 having integrally formed therewith a nut 41 which extends inwardly through the vertical slot 30 and is engaged by the thread shaft 38. The collar 40 includes a part extending through the slot 30 and is provided with a key 43 which holds it against rotation on the column 28. It provides a support for a clamping sleeve 42 which is at least partially split and provided with clamping ears, one of which is seen at 44, adapted to be urged together by a clamping bolt 46 so as to rigidly secure the sleeve 42 in adjusted position on an upwardly extending inner sleeve 47 on the collar 40. In order to effect vertical adjustment of the sleeve 42 and the structure supported thereby, the worm shaft 34 may be rotated to effect rotation of the vertical shaft 38, thereby moving the collar 40 vertically to position the clamping sleeve 42 in the required vertical position.

The sleeve 42 is provided with a flat supporting surface 48 to which a bracket 50 is bolted as by bolts 52. The bracket 50 includes a laterally extending horizontal support arm 54 which is apertured to receive a pivot stud 56 which extends through a tilt head support 58. The tilt head support 58 includes a base portion 60 resting upon the upper surface of the horizontal arm 54 of the bracket 50 and further includes an elongated upwardly extending portion 62 to provide a firm mounting on the stud 56. The assembly of the tilt head support 58 and bracket 50 is completed by a nut 64 received on the threaded end of the stud 56. The tilt head support 58 further is provided with a horizontally extending threaded opening adapted to receive a tilt head mounting stud 66 having a nut 67 at its outer end. The mounting stud 66 extends through an opening 68 in a motor plate mounting block 69. The details of this construction are best illustrated in Figures 4, 5 and 6. The block 69 is provided with a threaded flange 70 as shown in the broken away portion of Figure 5, which receives an abutment screw 71, the end of which engages an abutment 72 on the bracket 62 so as to provide a firm support for the block 69 in any position of angular adjustment about the axis of the stud 66.

The block 69 has an opening 74 therethrough which receives the shaft portion 76 of a gear 78. Extending through a parallel opening 80 in the block 69 is a shaft 82 carrying a pinion 84 at one end thereof which meshes with the gear 78. At its opposite end the shaft 82 has keyed or otherwise secured thereto a worm gear 86. The block 69 has an enlarged housing portion 88 in which is mounted a worm 90 meshing with the worm gear 86. The worm 90, as best illustrated in Figure 6, is keyed or otherwise secured to a shaft 92 having a squared end 94 by means of which the worm may be rotated by a suitable hand tool. Obviously, rotation of the worm 90 results in rotation of the pinion 84 and hence in rotation of the gear 78 about the axis of its shaft 76.

Mounted on a pilot stud 96 projecting outwardly from the gear 78 is a motor plate support bracket 98 provided with ways indicated at 100 in which is mounted a motor mounting plate 102 to which the driving motor for the mechanism is mounted. The bracket 98 has a nut 104 secured thereto and the motor mounting plate 102 carries an adjusting screw 106 provided with a squared end 108. Adjustment of the plate 102 on the bracket 98 and the consequent movement of the motor is provided for the purpose of controlling belt tightness between a motor driven pulley and a pulley connected to the means for effecting movement of the belt, as will subsequently be described.

Figure 3:
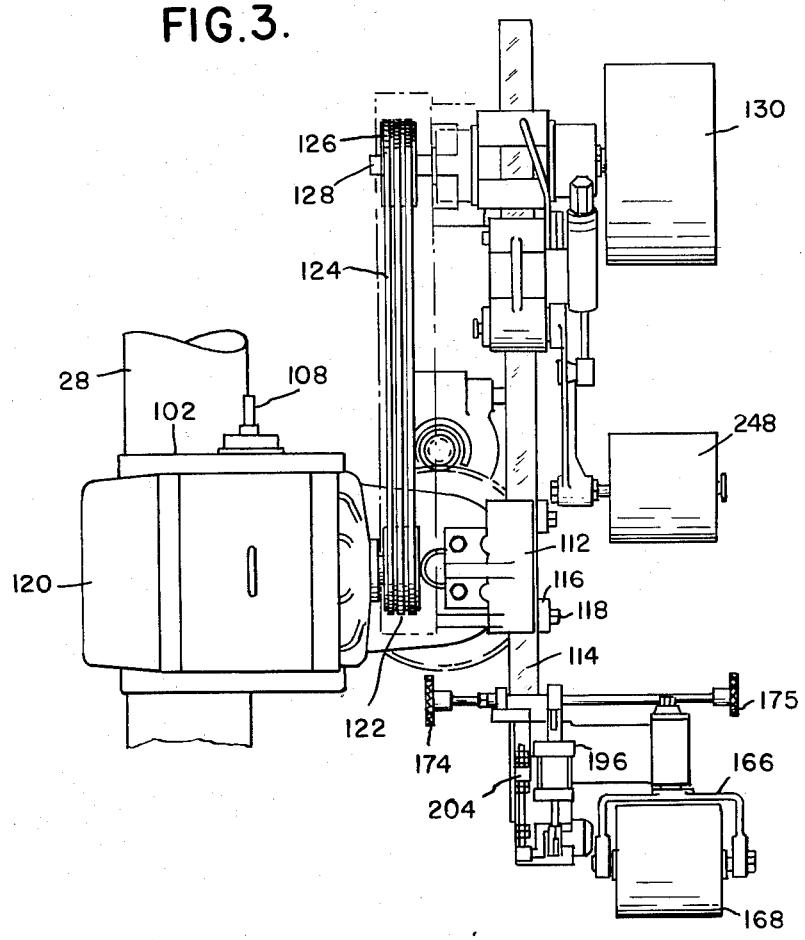
Figure 3 is a fragmentary side elevational view of the machine as seen from the left in Figure 1.
Figure 7:
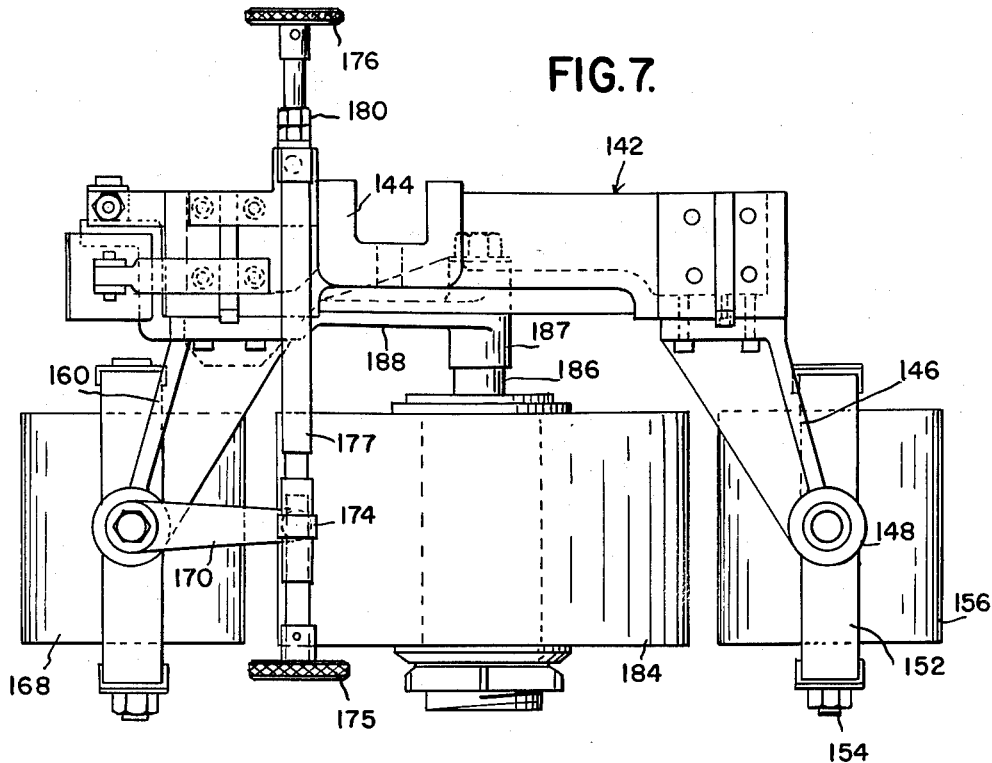
Figure 7 is a vertical plan view through the tracking pulley and contact wheel assembly.
Figure 8:
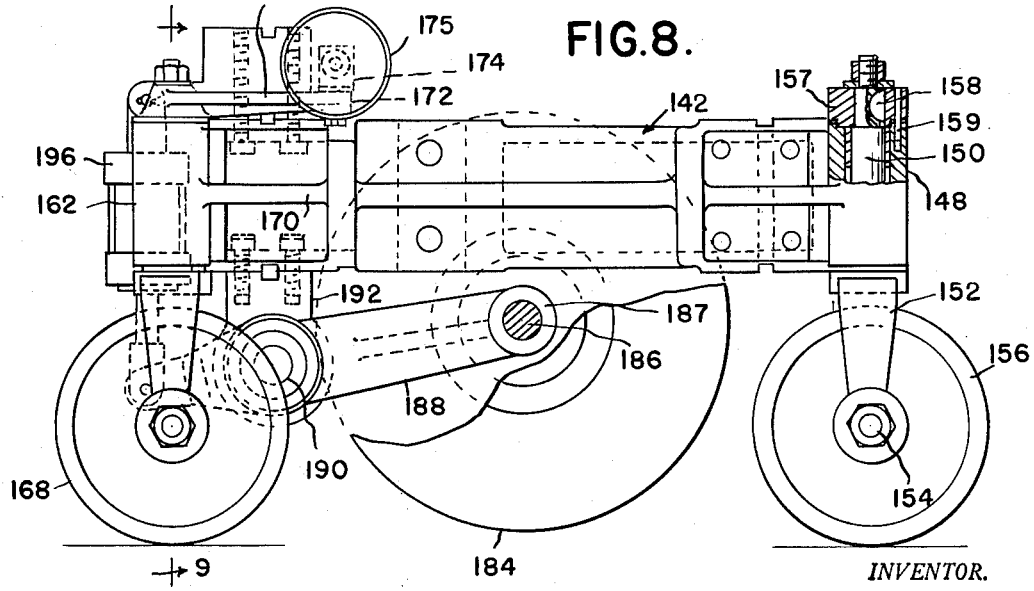
Figure 8 is a front elevational view of the assembly shown in Figure 7.

The motor support bracket 98 is provided with a flat pad portion 110 to which is bolted a bracket 112, best seen in Figure 3, the bracket having a square recess therein for the reception of a mounting arm 114. The arm 114 is preferably of square cross-section and is secured in the bracket 112 by clamping plates 116 secured by bolts 118.

From the foregoing described construction it will be observed that the motor is mounted on a motor plate which may be adjusted about the axis of the shaft 76 by the tilt gear mechanism including the worm 90, worm gear 86, pinion 84 and gear 78. In addition, it will be observed that the block 69 may be adjusted about the axis of the stud 66 which extends through the opening 68 provided in the block 69. Furthermore, the tilt head support 58 is adjustable about the vertical axis of the stud 56. Furthermore, the tilt head support 58 is adjustable with the bracket 50 about the vertical axis of the column 28 and is also adjustable therewith vertically with respect to the column 28. From the foregoing it will be apparent that the motor support bracket 98 and the parts carried thereby may be adjusted universally to accommodate the apparatus to positions required in engaging surfaces of work pieces.

Figure 1:
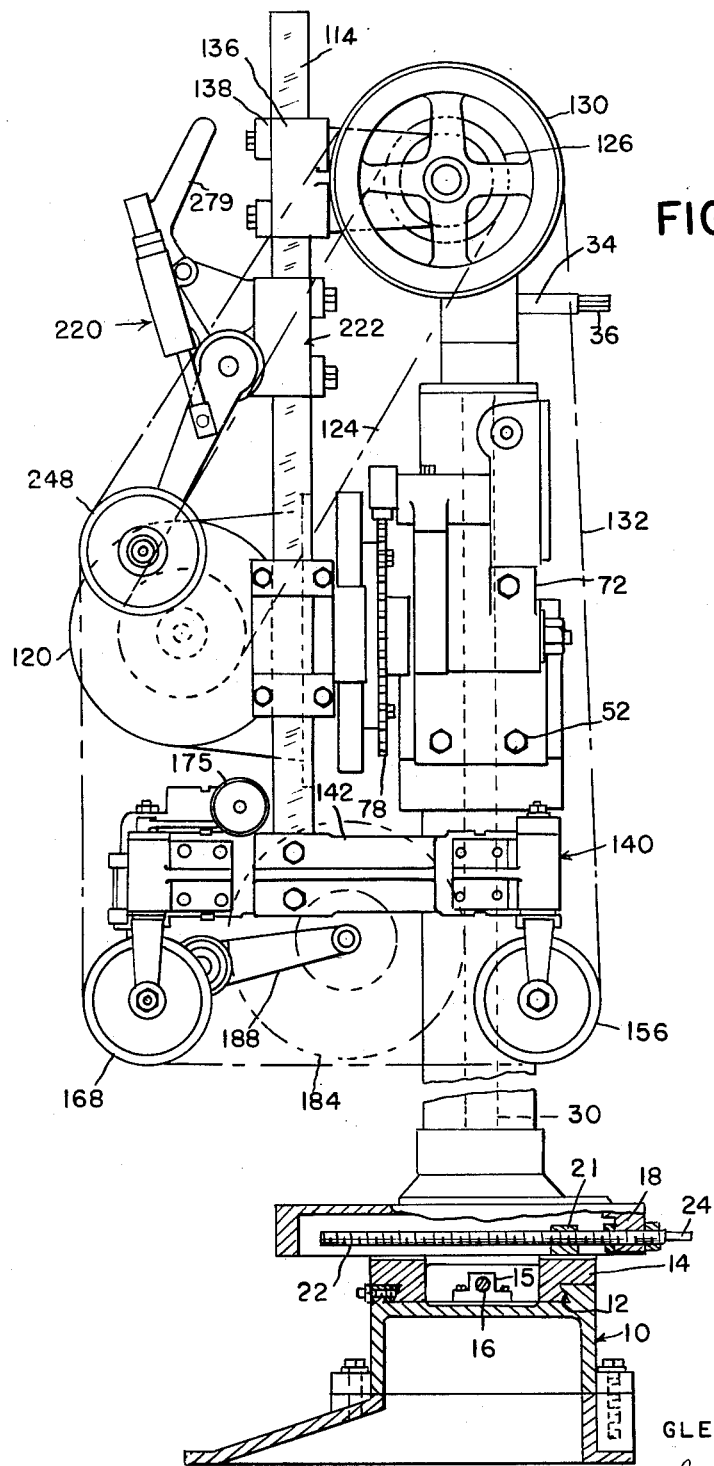
Figure 1 is a front elevation of the belt polisher machine, partly in section.

As best seen in Figure 3, the motor support plate 102 carries a motor 120 having driving pulleys 122 adapted to be connected by drive belts 124 to pulleys 126 keyed or otherwise secured to a spindle 128, the opposite end of which carries a pulley 130 which drives the abrasive or polishing belt indicated at 132 in Figure 1. The drive shaft spindle 128 is mounted in a housing 134 which includes an extension 136 having a square recess therein adapted to receive the square mounting arm 114. The drive shaft spindle housing 134 is rigidly secured in position on the arm 114 by clamp plates 138.

Carried adjacent the lower end of the mounting arm 114 is the tracking pulley and contact wheel assembly 140, details of which are best seen by reference to Figures 7–10. Rigid bracket structure 142 is provided having a square recess 144 adapted to receive the lower end of the mounting arm 114. The bracket structure 142 includes a bracket 146 terminating in a journal 148 which receives a shaft 150. At the lower end of the shaft 150 are outwardly and thence downwardly extending arms 152 having openings at the ends thereof for the reception of a shaft 154 for mounting a guide roller 156. A collar 157 is secured to the upper end of shaft 150 and is keyed thereto by key 158. In addition, collar 157 is pinned to journal 148 by pins 159. This arrangement provides for assembly of the parts as illustrated, or with the pulleys 156 at the other end of bracket 142 to provide for selective right and left hand assembly.

At the opposite end of the bracket structure 142 there is provided another bracket 160 similar to the bracket 146 and terminating at its outer end in a journal portion 162 which receives a shaft 164 extending upwardly from a forked mounting member 166 between the arms of which is journaled a second guide roller 168. Means are provided for effecting angular adjustment of the guide roller 168 about the vertical axis of its shaft 164 and this means comprises an arm 170 fixedly connected to the upper end of the shaft 164 and having its outer end 172 pivotally connected to a block 174 adjustable by means of hand wheels 175 and 176 by virtue of a threaded connection between the shaft 177 and the block 174. The shaft 177 is held against longitudinal movement by a support 178 carried by a bracket 179 secured to the bracket 142. The shaft includes a shoulder abutting against one end of the support 178 and is threaded to receive nuts 180 which cooperate with the support 178 to locate the shaft 177 for rotation without longitudinal movement. This adjustment of the guide roller 168 is for the purpose of adjusting tracking of the operating belt about the pulleys mounting such belt.

Means are provided for mounting a contact wheel 184 intermediate the guide rollers 156 and 168 and for providing for relative vertical movement of the contact wheel 184. For this purpose the wheel 184 is mounted for rotation on a shaft 186 carried by an end portion 187 of a lever arm 188 pivoted intermediate its ends on the shaft 190 received in a journal 192. The lever 188 extends beyond the shaft 190 and terminates in a bifurcated end portion providing spaced arms 193 and 194, best illustrated in Figure 10.

Carried by the bracket 142 is an air cylinder 196 having a piston therein connected to a piston rod 198, the lower end of which is bifurcated to embrace the arm 193 and is pivoted thereto by pivot pin 200. The other arm 194 of the lever 188 has connected thereto a threaded element 202 extending through an opening in a lug 204 and carries abutment nuts 206 and 208 to limit the stroke of the piston.

Figure 9:
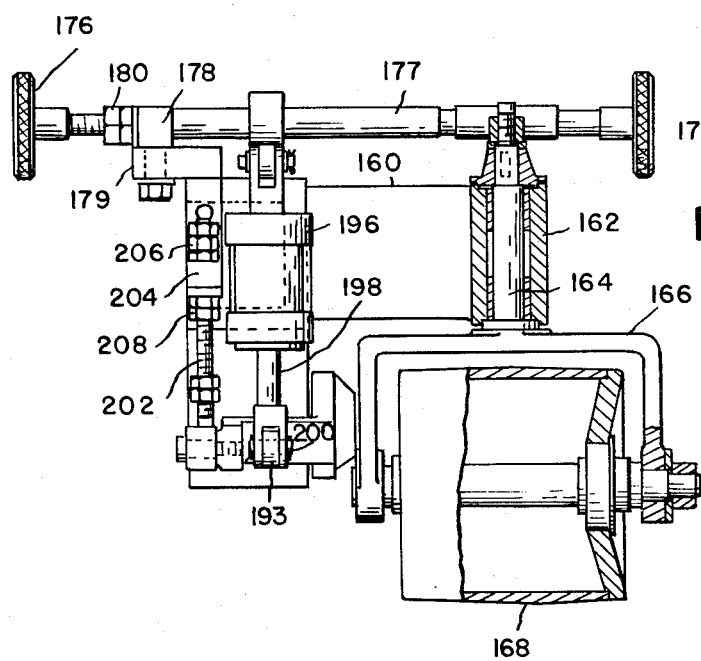
Figure 9 is a sectional view on the line 9—9, Figure 8.

In the position shown in Figure 9, the nuts 206 engage the upper surface of the lug 204 which means that the piston rod is in its lower position and accordingly the contact wheel 184 is in its upper position. Suitable means are provided for supplying air to the air cylinder 196 and for controlling the air so as to carry out the desired cycle. When air is admitted to the air cylinder 196 in the proper direction the connections are such that the contact wheel 184 is urged downwardly so as to press the operating belt against the work piece with a desired pressure. Means may be provided for reversing the air in the cylinder 196 so as to elevate the contact wheel 184.

Preferably however, the contact wheel 184 has associated therewith spring biasing means effective to urge the contact wheel toward the inner side of the belt so as to press the operating side of the belt against the work. The spring biasing means is preferably adjustable so that the pressure between the operating surface of the belt and the work may be predetermined and accurately adjusted. In this case when air is admitted to the cylinder 196 it is effective to overcome the spring means and to move the contact wheel away from the work. When air pressure is released from the air cylinder, the spring is effective to press the contact wheel toward the work with a predetermined accurately adjusted pressure.

Figure 10:
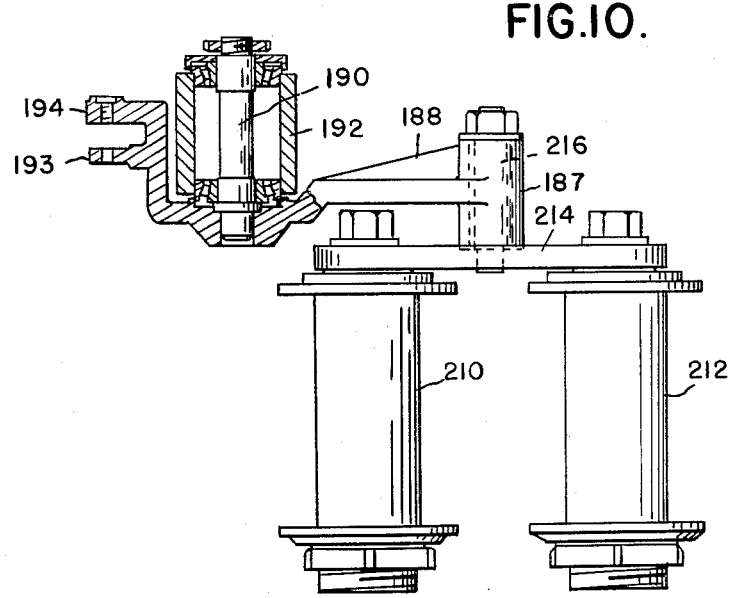
Figure 10 is a plan view, partly in section, of optional mechanism for supporting a pair of floating contact wheels in place of the single contact wheel illustrated in the preceding figures.

In Figure 10 there is illustrated an alternative arrangement in which a pair of contact wheels 210 and 212 are provided on a floating bar 214 including a shaft 216 journaled within the end portion 187 of the lever arm 188. With this construction the wheels 210 and 212 may accommodate themselves as a work piece is advanced beneath the contact wheels.

Means are provided for keeping the operating belt 132 under desired tension and this means comprises the belt tightening mechanism indicated generally at 220 and best illustrated in Figures 11–14. This mechanism comprises a mounting bracket 222 having a rectangular recess 224 adapted to receive the square support arm 114 and is clamped in place on the arm by means of bars 226 held in place by bolts 230.

The bracket 222 is provided with an opening 232 receiving bearings 234 mounting a shaft 236 therein for rotation. A belt supporting lever 238 has an end portion 240 secured to the projecting end 242 of the shaft thereby mounting the lever 238 for rotation about the axis of the shaft 236. At its outer end the lever 238 is provided with an apertured boss 244 which receives a shaft 246 carrying a tension roll 248.

Means are provided for applying a predetermined spring tension to the lever arm 238 and for selectively releasing the spring pressure. This means comprises a rod 250 having at one end portion thereof an apertured block 252 receiving a pivot pin 254 extending outwardly from an apertured boss 256 formed on the lever 238 intermediate the ends thereof. The rod 250 has threadedly secured to its opposite end an adjustable spring abutment 258 provided with a tubular sleeve 260 extending longitudinally of the rod 250 therefrom. The sleeve 260 is slidably received in an outer sleeve 262 having an apertured end closure 264 constituting a spring seat. Intermediate the closure 264 and spring abutment 258 is a coiled compression spring 266.

The sleeve 260 is welded or otherwise secured to a block 268 mounted on a pivot pin 270 which in turn is mounted on a rotatable block 272 rotatably supported on a pivot pin 274 journaled within a transverse opening 276 formed at one end of an arm 278 extending upwardly from the main portion of the bracket 222. Rigidly secured to the block 272 is an operating handle 279.

With the parts in the relationship illustrated in Figure 13 it will be observed that the outer sleeve 262 and its end closure 264 are in a position to apply substantial pressure to the compression spring 266, thereby urging the inner sleeve 260 and spring abutment 258 together with the rod 250 upwardly. The spring force thus applied to the rod 250 biases the tension roll 248 in a clockwise direction as seen in Figure 11, thereby applying a predetermined spring pressure to the operating belt 132. At the same time it will be observed that the axis of the pivot pin 270 lies to the right of a line joining the axis of the pivot pin 254 with the axis of the pivot pin 274. Since the compression spring is establishing a force downwardly as seen in Figure 13, against the outer sleeve 262, this force establishes a clockwise bias to the pivot pin 270. The operating handle 279 includes an extension 280 and the upwardly extending arm 278 of the bracket 222 is provided with a stop pin 282 illustrated as provided with a flat surface 284 engageable by a corresponding surface of the extension 280 of the lever. Accordingly, the spring forces developed in this illustrated relationship constitute an over-center device holding the parts in the position illustrated in Figure 11 and applying a predetermined clockwise force to the lever 238. If it is desired to release the belt tensioning lever, the operating handle 279 is swung counterclockwise as seen in Figure 11, thereby swinging the pivot pin 270 counterclockwise about the axis of the pivot pin 274 and consequently moving the outer sleeve 262 and its end closure 264 downwardly and to the right, as seen in Figures 11 and 13. This movement of the outer sleeve 262 may be sufficient to relieve all compression of the spring 260 so that the roll 248 applies no belt tensioning force. In order to re-establish tension in the belt it is of course only necessary to swing the operating handle 279 to the full line position illustrated in Figure 11, at which time it will be retained in position due to the over-center relationship between the various axes in relation to the forces applied by the compression spring.

Referring again to the structure illustrated in Figure 10, and to Figures 15–17, there are illustrated several possible operating conditions employing a pair of contact wheels 300 mounted on the spindles 210 and 212 carried by the rocking bar 214, details of which are illustrated in Figure 10.

In Figure 15 the operating belt 132 is disclosed as leading over guide pulleys 156 and 168 and engaging the peripheries of the balanced contact wheels 300. It will be recalled that the rocking bar 214 is carried by the shaft 216 which in turn is carried by the bracket 188 (see Figure 10) mounted for rocking movement about a stationary pivot 190 and including means biasing the balanced contact wheels 300 toward the work piece. In Figure 15 there is disclosed an operation in which an irregular work piece W1 is advanced past the endless belt 132 along a path generally indicated at 302 which in this instance is indicated as a straight line path. The work piece W1 may for example be a bumperette of irregular outline and may be mounted so that as it is traversed from left to right in Figure 15 it partakes of a gradual turning movement about an axis indicated at 304 in the direction indicated by the arrow. In the full line position of the work piece W1 it will be observed that it has rocked the bar 214 clockwise from a neutral position and that the left hand roller or contact wheel 300 is pressing the belt against the periphery of the work piece. When the work piece reaches an intermediate position, as indicated in dotted lines, the rocking bar 214 has again assumed a position parallel to a line joining the guide rolls or pulleys 156 and 168 and that the portion of the operating belt 132 intermediate the wheels 300 is pressed thereby against the outer surface of the work piece with a slight wrap-around. Moreover, due to the proximity of the wheels 300 to the work piece the belt is supported in a particularly desirable fashion to carry out its abrading or polishing operation. It will be appreciated that as the work piece continues its rectilinear movement to the right accompanied by its gradual turning movement in a counterclockwise direction it will eventually engage the right hand contact wheel 300 and rock the bar 214 in a counterclockwise direction to permit movement of the work piece therepast.

Referring now to Figure 16 there is illustrated an arrangement in which the balanced contact wheels 300 operate on a plurality of work pieces W2 which in this instance are illustrated as moving in a curved linear path 310 so disposed with relation to the mechanism as to engage the operating surface of the belt 132. In this instance it may be assumed that the work pieces W2 are advanced continuously and are rotated at substantial speeds so that the entire peripheral portion thereof will be abraded or polished during the interval between engaging and separating from the operating belt 132. In this figure there are illustrated a plurality of work pieces W2 which are shown in full line in one position and in dotted lines in a second position. In the full line position of the work pieces W2 it will be observed that the one at the left is directly opposite the left hand contact wheel 300 and accordingly will have rocked the wheel and the bar 214 clockwise about the axis of the pivot support 216. At the same time the two work pieces W2 immediately to the right of the work piece previously referred to are spaced from the right hand contact wheel 300, so that clockwise movement of the right hand wheel 300 to the full line position illustrated is permitted. The work piece intermediate the balanced contact wheels 300 is engaged by the operating surface of the wheel throughout a substantial area due to wrap-around and at the same time a desirable predetermined pressure contact between the operating surface of the belt and the work piece is maintained, as by suitable adjustment of the spring effective to bias the contact wheels toward the work pieces. When the work pieces W2 reach the dotted line position it will be observed that one is directly opposite to the right hand contact wheel 300 which has the effect of rotating the bar 214 counterclockwise to the dotted line position, such movement being permitted due to the fact that the work pieces adjacent the left hand contact wheel are separated therefrom.

Referring now to Figure 17 there is illustrated an arrangement in which a work piece W3 is advanced intermittently with respect to the operating belt. The work piece W3 is illustrated in full line position adjacent the left hand contact wheel 300 at which time it has rocked the bar 214 clockwise about the axis of its pivot mounting 216 to the full line position shown. This illustrates a condition during advance of the work piece W3 to the operating position illustrated at the right. The work piece W3 is advanced to the second position at which time it is brought to rest and is thereafter rotated while in such position. At this time it is substantially midway between the contact wheels 300 and the contact wheels have the effect of producing a desirable contact between the operating surface of the belt 132 and the surface of the work piece W3. After the peripheral surface of the work piece has been finished, the work piece is further advanced to the right out of the working zone, a new work piece being moved into the operating zone at the same time. Obviously of course, the work pieces will be spaced apart so that a single work piece is operative to rock the bar 214 clockwise as it moves into the operating zone, and counterclockwise as it moves out of the operating zone without interfering with the next succeeding or preceding work piece.

It will also be recalled that the bar 214 while freely oscillatable about the axis of its pivot mounting 216, is carried at one end of a bracket 188 which in turn is mounted for rocking movement and is provided with yieldable means such for example as an adjustable spring, operable to urge the pivot mounting 216 of the bar 214 toward the inner surface of the belt 132, or in other words toward the work pieces. Thus, both of the contact wheels 300 will be maintained in contact with the inner surface of the belt at all times, irrespective of the position to which the mounting bar 214 may swing as a result of proximity between an individual work piece and one or the other of the contact wheels 300.

The present apparatus is substantially universally adjustable so that the operating surface of the operating belt may be located at substantially any desired position in space. The operating portion of the belt is urged against the work piece by the contact wheel 184. This wheel is resiliently urged against the belt by a predetermined force and is mounted so that it may float. The contact wheel is disposed intermediate a pair of adjacent guide pulleys so as to provide extended area contact between the surface of a work piece and the operating surface of the belt, where the surface of the work piece permits such contact.

In the alternative form of the invention a pair of contact wheels 300 may be provided which are mounted for floating movement as a unit toward and away from the work piece and which may have complementary oscillatory movement about an intermediate axis so as to provide an improved operating condition.

The apparatus may be provided with automatic controls supplying air to the air cylinder 196 so as to move the contact wheels upwardly to permit passage thereneath of elevated portions of work pieces and when the contact wheels are elevated the tension roll 248 will cause the portion of the operating belt intermediate the guide pulleys 156 and 168 to assume a straight line tangent condition.

Accordingly, the apparatus is adapted to perform abrading, polishing, or finishing operations on a variety of work pieces by adjusting the mechanism in accordance with the surfaces of the work piece. A plurality of similar devices may be mounted in position relative to work supporting mechanism so that a sequence of work pieces may be advanced sequentially past the series of devices so as to finish all desired surfaces of the work pieces. The work supporting device may be arranged to advance the work pieces in straight line relationship or may comprise a rotating table so that the work pieces are advanced in a circular path.

The drawings and the foregoing specification constitute a description of the improved belt polisher lathe in such full, clear, concise and exact terms as to enable any person skilled in the art to practice the invention, the scope of which is indicated by the appended claims.

What I claim as my invention is:

1. Apparatus of the class described comprising a vertical column, a first support member movable vertically on and angularly adjustable about said column, a second support member carried on said first support member for angular adjustment about a vertical axis spaced laterally from the axis of said column, a third support member mounted on said second member for angular adjustment about a horizontal axis, a fourth support member mounted on said third support member for angular adjustment about an axis perpendicular to said horizontal axis, a bracket rigidly mounted on said third support, an elongated arm on said bracket, a drive pulley carried by said arm, a pair of guide pulleys carried by said arm, a contact wheel intermediate said guide pulleys mounted for movement generally perpendicular to a plane joining the axes of said guide pulleys, a tension adjusting pulley carried by said arm, and an operating belt trained over said pulleys and contact wheel.

2. Apparatus as defined in claim 1 comprising a motor carried by said third support member, and a drive belt connecting said motor and drive pulley.

3. Apparatus as defined in claim 2 comprising yieldable means urging said contact wheel outwardly against the inner surface of said belt.

4. Apparatus as defined in claim 3 comprising means for selectively urging said contact wheel outwardly and inwardly.

5. Apparatus of the character described comprising a plurality of pulleys, a belt trained around said pulleys, a contact wheel engageable with the inner surface of said belt, one of said pulleys being a belt tensioning pulley, a pivoted arm on which said belt tensioning pulley is mounted, a lever mounted adjacent said arm, spring means interconnecting said arm and lever normally effective to bias said arm in belt tensioning direction, said lever being movable to a position to release the force of said spring and being movable in a direction to stress said spring means to an over-center relation, and an abutment limiting movement of said lever in over-center relation to a position where said spring means is substantially stressed.

6. Apparatus of the class described comprising a column, a support arm carried by said column for angular adjustment about three closely spaced mutually perpendicular axes, a motor on said arm, a driving pulley on said arm, a pair of guide pulleys on said arm, a drive belt connecting said motor and drive pulley, and operating belt trained around said pulleys, a contact wheel yieldably mounted intermediate said guide pulleys for yieldable engagement with the inner surface of said operating belt intermediate said pulleys.

7. Apparatus as defined in claim 6 comprising reversible means operably connected to said contact wheel for selectively moving said wheel into and out of engagement with the inner surface of said operating belt.

8. Apparatus as defined in claim 7 in which said reversible means is an air cylinder.

9. Apparatus of the class described comprising a column, a support arm carried by said column for angular adjustment about three closely spaced mutually perpendicular axes, a motor on said arm, a driving pulley on said arm, a pair of guide pulleys on said arm, a drive belt connecting said motor and drive pulley, an operating belt trained around said pulleys, contact means comprising a bar pivoted intermediate its ends on an axis parallel to and spaced between the axis of said guide pulleys, a pair of contact wheels mounted on said bar, and yieldable means urging said bar toward the inner surface of said operating belt.

10. Apparatus of the class described comprising a driving pulley and a pair of guide pulleys having substantially parallel axes, an endless operating belt trained around said pulleys and having an outer working surface engageable with work pieces intermediate said guide pulleys, an arm extending generally longitudinally of the run of the belt intermediate said guide pulleys having one end pivoted for rocking movement about an axis parallel to the pulley axes and a free end located substantially midway between said guide pulleys, a bar pivoted to the free end of said arm for rocking movement about an axis parallel to the pivot axis of said arm, contact wheels adjacent the ends of said bar mounted for rotation about axes parallel to the pivot axis of said bar and engageable with the inner surface of said belt, and resilient means operatively connected to said arm yieldingly urging the free end of said arm toward the inner surface of said belt.

11. Structure as defined in claim 10 comprising means operatively connected to said arm and selectively operable to move the free end of said arm in a direction away from the inner surface of said belt against the action of said resilient means.

12. In apparatus of the class described, an arm pivotally mounted at one end, a belt tightening pulley at the other end of said arm, a rod pivotally connected to said arm intermediate its ends, an adjustable head on said rod, an inner sleeve fixed to said head and surrounding a portion of said rod, an outer sleeve slidable on said inner sleeve, a head on said outer sleeve, a spring extending between said heads, a bracket adjacent said outer sleeve, a lever pivotally mounted to said bracket, means pivotally connecting said lever to said outer sleeve at a point spaced from the pivot mounting of said lever, and abutment means on said lever and bracket engageable when said lever is in position to compress said spring and when the axis of the pivot connection between said sleeve and lever is out of alignment in over-center relation with the line joining the pivot axis of said lever and the pivot connection between said arm and said rod.

13. Apparatus of the class described comprising a base, a vertical column on said base, a support vertically adjustable on said base, a bracket on said support, a tilt head support mounted on said bracket for adjustment about a vertical axis, a tilt head mounted on said tilt head support for adjustment about a horizontal axis, a motor support bracket mounted on said tilt head for adjustment about a second horizontal axis perpendicular to said first horizontal axis, a motor on said motor support bracket, a support arm carried by said motor support bracket, a drive pulley on said support arm, a belt tensioning pulley on said support arm, a second bracket on said support arm, a pair of guide pulleys on said second bracket, an operating belt trained over said pulleys and drive means connecting said motor to said drive pulley.

14. Apparatus as defined in claim 13 in which said support arm is of rectangular cross-section, and in which said drive pulley, said belt tensioning pulley, and said second bracket are each independently and adjustably secured to said support arm.

References Cited in the file of this patent

UNITED STATES PATENTS

| | | |
|---|---|---|
| 236,475 | Ambler et al. | Jan. 11, 1881 |
| 348,177 | Totman | Aug. 21, 1886 |
| 617,940 | Rowland | Jan. 17, 1899 |
| 637,121 | Huseby | Nov. 14, 1899 |
| 1,735,903 | Johnson | Nov. 19, 1929 |
| 2,431,795 | Elmes | Dec. 2, 1947 |
| 2,431,822 | Murray | Dec. 2, 1947 |
| 2,587,603 | Czarnecki | Mar. 4, 1952 |
| 2,618,913 | Plancon et al. | Nov. 25, 1952 |
| 2,624,158 | Hendrickson | Jan. 6, 1953 |